(12) United States Patent
Samra et al.

(10) Patent No.: US 6,538,089 B1
(45) Date of Patent: Mar. 25, 2003

(54) GELS WITH A SHAPE MEMORY

(75) Inventors: Babinder Samra, Oxford (GB); Igor Galaev, Lund (SE); Bo Mattiasson, Lund (SE)

(73) Assignee: Forskarpatent I SYD AB, Lund (SE)

( * ) Notice: Subject to any disclaimer, the term of this patent is extended or adjusted under 35 U.S.C. 154(b) by 0 days.

(21) Appl. No.: 09/890,639

(22) PCT Filed: Feb. 4, 2000

(86) PCT No.: PCT/SE00/00216
§ 371 (c)(1),
(2), (4) Date: Nov. 20, 2001

(87) PCT Pub. No.: WO00/46262
PCT Pub. Date: Aug. 10, 2000

(30) Foreign Application Priority Data

Feb. 5, 1999 (SE) ............................................. 9900378

(51) Int. Cl.[7] ............................................. C08F 212/00
(52) U.S. Cl. .................... 526/307.4; 526/262; 526/264; 526/307.3; 526/307.5; 526/307.7; 526/307.8; 526/320; 526/329.2; 526/347
(58) Field of Search ................................. 526/262, 264, 526/307.3, 307.4, 307.5, 307.7, 307.8, 320, 329.2, 347

(56) References Cited

U.S. PATENT DOCUMENTS 5,834,007 A * 11/1998 Kubota ........................ 424/443
6,018,033 A *  1/2000 Chen et al. ................... 536/4.1
6,271,300 B1 *  8/2001 Ohsumi et al. ............. 524/521

OTHER PUBLICATIONS

S. Senel, B. Isik–Yuruksoy, H. Ciciek, and A. Tuncel, "Thermoresponsive Isopropylacrylamide–Vinylpyrrolidone Copolymer By Radiation Polymerization," J. Appl. Polym Sci., vol. 64, 1997, pp. 1775–1784.
Jing Zhang, and Nicholas A. Peppas, "Synthesis and Characterization Of PH– and Temperature–Sensitive Poly-(Methacrylic Acid)/Poly)N–Isopropylacrylamide) Interpentrating Polymeric Networks, " Macromolecules, vol. 33, 2000, pp. 102–107.
I.Y. Galeav, M.N. Gupta, and B. Mattiasson, "Use Smart Polymers For Bioseperations," Enabling Science, 1996, pp. 19–25.
Hiroshi Hachisako, and Ryoichi Murakami, "Molecular Assemblies From N– Isopropylacrylamide Oligomers And Their Applications," Recent Res. Devel. in Pure & Appled Chem., vol. 2, 1998. pp. 547–561.
Lev E. Bromberg, and Eyal S. Ron, "Temperature–Responsive Gels and Thermogelling Polymer Matrices For Protein And Peptide Delivery," Advanced Drug Delivery Reviews, vol. 31, 1998, pp. 197–221.
Alexander V. Kabanov, Elena V. Batrakova, Nikolai S. Melik–Nubarov, Nikolai A. Fedoseev, Tatiyana Yu. Dorodnich, Valery Yu. Alakhov, Vladimir P. Chekhonin, Irina R. Nazarova, and Victor A. Kabanov, " A New Class Of Drug Carriers: Micelles Of Poly (Oxyethylene)–Poly(Oxyprpylene) Block Coploymer As Microcontainers For Drug Targeting From Blood In Brain," Journal of Controlled Release, vol. 22, 1992, pp. 141–158.
Maolin Zhai, Jiuhong Zhang, Min Yi, and Hongfei Ha, "Study On Synthesis and Characteristics Of Temperature Sensitive Hydrogel PolyNIPAAm And PolyNIPAAm/NASI By Radiation," File Caplus, No. 1995–443345, Document No. 123:84141, Dep. Technical Physics, 1994, vol. 7(4), pp. 198–204.
Lendlein, A. et al., Science, vol. 296, May 31, 2002, pp. 1673–1676.
Jeong, B. et al., Trends in Biotechnology, vol. 20, No. 7, Jul. 2002, pp. 305–311.
Pepas, N.A., et al., Pharmaceutical Research, vol. 19, No. 5, May 2002, pp. 578–587.
Seeboth, A., et al. Polym. Adv. Technol. 13, 507–512 (2002).
Dagani, R., C&EN, Sep. 18, pp. 30–33.
Shibayama, M., et al., Advances in Polymer Science, vol. 105, 1993, pp. 44–62.
Suzuki, M., et al., Advances in Polymer Science, vol. 110, 1993, pp. 242–261.
Kost, J., et al., Tibtech, Apr. 1992 (vol. 10), pp. 127–131.

* cited by examiner

*Primary Examiner*—Helen L. Pezzuto
(74) *Attorney, Agent, or Firm*—McDermott, Will & Emery

(57) ABSTRACT

A physically cross-linked copolymer comprising hydrophobic monomers, hydrogen bonding monomers, and thermosensitive monomers, said thermosensitive monomers having a distinct phase change at its lower critical solution temperature (LCST) when existing as a homopolymer. The physically cross-linked copolymer is used for drug delivery system or for enzyme delivery system. The physically cross-linked copolymer is also used for casting shapes of cavities, for production of miniaturized, detailed micro-parts or micro-machine parts, or for production of thermal switches.

16 Claims, 3 Drawing Sheets

GELS WITH A SHAPE MEMORY

The present invention relates to a physically cross-linked copolymer and uses of the copolymer.

In today's rapidly expanding technological world, there is an ever-growing trend for a new generation of "intelligent" materials. Materials can change their properties in accordance to their environment in a "smart" way. They have the advantage of being less limited by design constraints. One such category of these intelligent materials is "smart" or stimuli-responsive polymers.

Stimuli-responsive polymers have generated an explosion of interest since their relatively recent discovery due to their potential application In extraction, absorption, actuator and drug-delivery systems. These polymers are water-soluble but undergo a sharp conformational change to become water insoluble and separate out of solution, when a small change in temperature, pH or solvent composition takes place.

A thermo-sensitive smart polymer is soluble at temperatures below its lower critical solution temperature (LCST) and then undergoes a distinct phase change at the LCST, see Galaev, I. Y. et al. CHEMTECH, (1996), pages 19–25. When chemically cross-linked, such polymers give stimuli responsive polymer gels. Application of an external stimulus can cause these gels to shrink or expand to many times their volume, with an expulsion or absorption of water.

Hachisako, H. et al., Recent Res. Devel. In Pure & Applied Chem. (1998), vol. 2, pages 547–561 describes formation of a shape-remembered hydrogel upon heating, which consists of a NIPAM telomer with a stilbazole terminal group. The hydrogel redissolves very slowly when cooled to below its cloud point without stirring.

It has now surprisingly been found according to the present invention, that a novel physically cross-linked copolymer of three different monomers also has the ability of forming a shape-remembering hydrogel upon heating.

SUMMARY OF THE INVENTION

An object for the present invention is to provide a "smart" gel, which is not chemically cross-linked.

Another object for the present invention is to provide a "smart" gel, which undergoes a sharp conformational change and is soluble in water under its LCST.

Thus, in accordance with the present invention, there are provided a completely novel, non-chemically cross-linked, thermo-sensitive polymer that separates from the solution on increasing temperature to form a physically cross-linked temporary gel, to yield the shape of the holding vessel. This gel can shrink substantially but still maintain the shape of the vessel. The shrunken polymer gel can be reshaped in another form, simply by dissolution on cooling and repeating the casting process using a different shaped vessel.

Preferable the thermosensitive physically cross-linked gel is formed only at a narrowly defined combination of three monomers, 1) N-isopropyl-acrylamide NASI or 2-hydroxyethyl methacrylate HEMA, 2) styrene and 3) N-acryloyl hydroxy-succinimide.

One embodiment of the present invention is a physically cross-linked;, copolymer comprising hydrophobic monomers, hydrogen bonding monomers, and thermosensitive monomers, said thermosensitive monomers having a distinct phase change at its lower critical solution temperature (LCST) when existing as a homopolymer.

Another embodiment of the present invention is a physically cross-linked copolymer of a three component system consisting of poly $(NASI_{18-47}\text{-styrene}_{10-26}\text{-NIPAAM}_{40-63})$, preferable poly$(NASI_{23-33}\text{-styrene}_{19-23}\text{-NIPAAM}_{48-58})$.

Another embodiment of the present invention is a physically cross-linked copolymer of a three component system consisting of poly$(HEMA_{1-8}\text{-styrene}_{19-30}\text{-NIPAAM}_{65-79})$.

Another embodiment of the present invention is use of the physically, cross-linked copolymer for casting shapes of cavities, for production of miniaturised, detailed micro-parts or micro-machine parts, or for production of thermal switches.

Yet another embodiment of the present invention is use of a physically cross-linked copolymer as drug delivery or enzyme delivery system.

Other preferred embodiments of the present invention are defined in the subclaims.

DETAILED DESCRIPTION OF THE PRESENT INVENTION

The overall structure of polymeric gels is governed by a balance, which exists between the attractive and repulsive forces of the cross-linked polymer chains. The four fundamental forces responsible for this are hydrogen bonding, Van der Waals interactions, hydrophobic interactions and ionic interactions.

Whilst these forces are balanced at lower temperatures, the polymer chains are swollen and incorporate water into the network. However, increasing the temperature disturbs this balance, increasing the attractive forces relative to the repulsive ones so that the incorporated water is forced out of the polymer network and the gel shrinks. The shrinking of the polymer gel is due to the enhanced hydrophobic intermolecular interaction of the polymer chains. The water molecules around the polymer gel have more order than those, which are more remote and hence have a lower entropy.

As the temperature is increased the gel shrinks and becomes more ordered, but at the same time the expelled water molecules become less ordered. Therefore, the resulting entropy of the overall polymer matrix is increased, forming the impetus for gel shrinkage and expulsion of water.

Chemically cross-linked, thermo-sensitive gels, are known to exist as copolymers, that possess at least one monomer component exhibiting temperature dependent aqueous solubility, Bromberg, L. E., et al. Advanced Drug Delivery Reviews, Elsevier Science B.V., (1998), 197–220.

This phenomenon was found to be true also, for a physically cross-linked polymer gel and for the inventors investigation this property was provided by N-isopropyl acrylamide (NIPAAM).

The distinctive feature for thermo-sensitive, physically cross-linked polymer gels, however, is in their ability to form reversible cross-links, and to maintain the vessel shape, on shrinkage. The two additional key monomers in the copolymer, that provide these characteristics, are a hydrophobic and a hydrophilic component, styrene and N-acryloxyl-succinimide (NASI), respectively. Styrene adds an element of hydrophobicity to the copolymer, aiding in precipitation. The hydrophilic component, N-acryloxylsuccinimide (NASI), is essential in the complementary formation of hydrogen bonds with NIPAAM, which play a key role in the cross-linking.

The composition range for the three monomers in the copolymer, where this thermo-sensitive, physically cross-linking phenomenon occurs, is quite narrow. Small deviations from this relatively narrow range disturb the necessary balance of forces, resulting in a polymer with more conventional properties.

EXPERIMENTS AND DISCUSSION

The reversibly cross-linked gels could be formed only at a defined combination of three monomers, N-isopropylacrylamide (NIPAAM), styrene and N-acryloyl hydroxysuccinimide (NASI), that were copolymerised by radical polymerisation, in THF using 2,2'-azobisisobutyronitrile initiator. After 24 h incubation at 80° C. the polymers were precipitated using diethyl ether and re-precipitated in THF/diethyl ether a second time.

Figure 1:
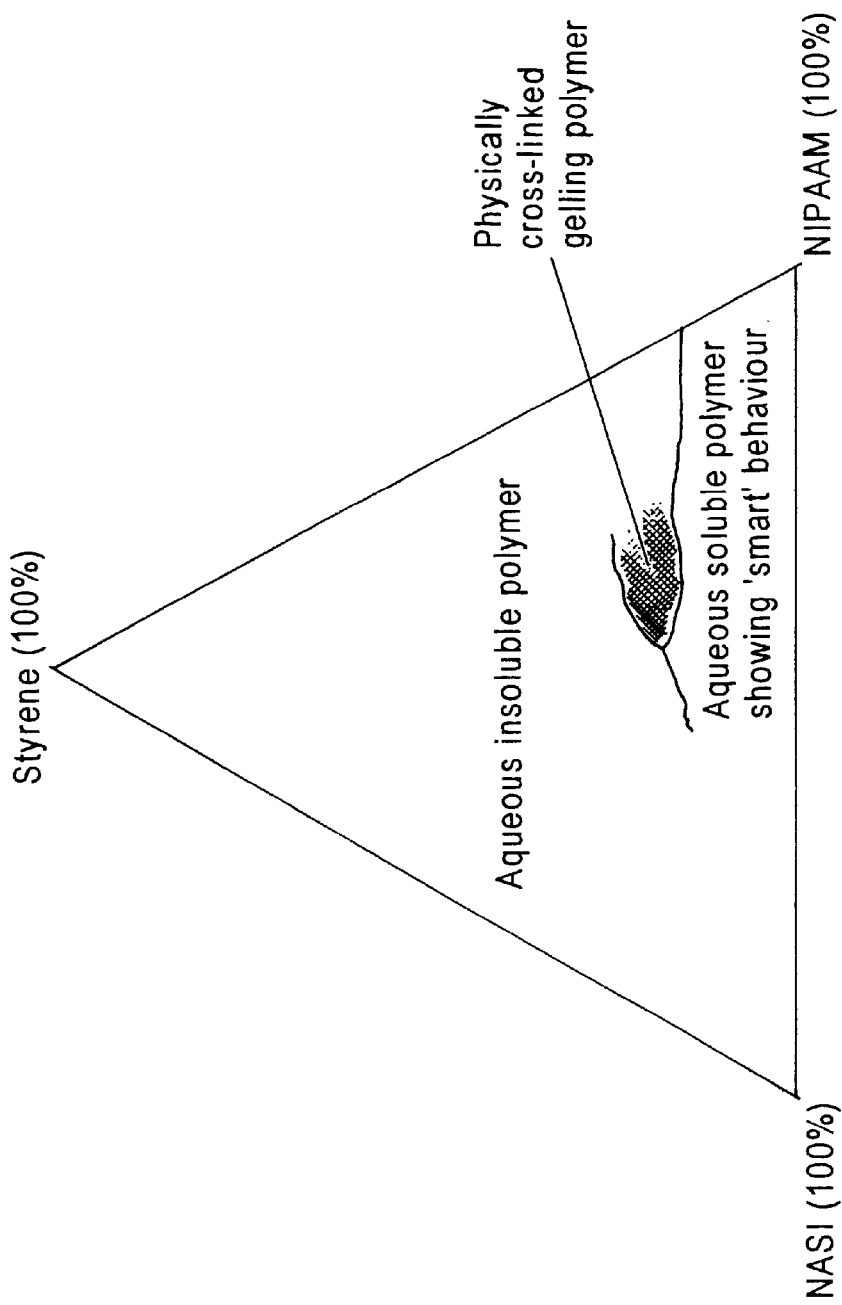
FIG. 1. Shows a composition diagram illustrating the small region of copolymer composition where physically cross-linked gel, formation is observed for a copolymer of NIPAAM, NASI and styrene FIG. 2. Shows different stages of the physical cross-linking phenomenon.

The composition of the polymers was determined by $^1$H-NMR. The composition range for the three monomers in the copolymer, where this physically cross-linking phenomenon occurs, is quite narrow (FIG. 1). Small deviations from this relatively narrow range disturb the necessary balance of forces, resulting in a polymer with more conventional properties.

For a copolymer of NIPAAM, styrene and NASI, the relative molar range was found to be 48–58%, 19–23% and 23–33%, respectively, which is found in Table 1 below. Too high a styrene content yielded an aqueous insoluble copolymer, and too low a styrene content prohibited cross-linking, resulting in a polymer with LCST that separates from solution as a suspension of a polymer enriched phase in an aqueous solution containing practically no polymer. Surprisingly, too high a NASI content also rendered the copolymer insoluble, even through NASI is readily soluble in water.

TABLE 1

Relative molar ratio of monomers in copolymers according to a preferred embodiment of the present invention (determined by NMR)

| | Poly (NASI$_x$-styrene$_y$-NIPAAM$_z$) | | | |
|---|---|---|---|---|
| Polymer | x | y | z | Comments |
| 1 | 25 | 35 | 40 | 0 |
| 2 | 35 | 20 | 45 | 0 |
| 3 | 40 | 19 | 41 | 0 |
| 4 | 25 | 15 | 60 | − |
| 5 | 37 | 14 | 49 | − |
| 6 | 39 | 16 | 45 | − |
| 7 | 44 | 13 | 43 | − |
| 8 | 21 | 23 | 56 | + |
| 9 | 22 | 20 | 58 | + |
| 10 | 23 | 22 | 55 | + |
| 11 | 29 | 19 | 52 | +++ |
| 12 | 29 | 22 | 49 | +++ |
| 13 | 30 | 19 | 51 | +++ |

TABLE 1-continued

Relative molar ratio of monomers in copolymers according to a preferred embodiment of the present invention (determined by NMR)

| | Poly (NASI$_x$-styrene$_y$-NIPAAM$_z$) | | | |
|---|---|---|---|---|
| Polymer | x | y | z | Comments |
| 14 | 32 | 19 | 49 | +++ |
| 15 | 33 | 19 | 48 | +++ |

(0) - aqueous insoluble copolymer; (−) - "smart" polymer type precipitation, but no gel formation; (+) - weak gel formation; (+++) - strong gel formation.

In Table 1 the relative peak areas of protons from the $^1$H NMR spectrum of three different pendant groups of the copolymers are compared with each other. 6H for NIPAAM (—C(O)—NH—CH (CH$_3$)$_2$) at ~1.3 ppm, 4H for NASI (—C(O)—N(C(O)—CH$_2$—)$_2$) at ~2.9 ppm and 5H for styrene (—C$_6$H$_5$) at ~7.3 ppm.

The formation of these NIPAAM-NASI-styrene, physically cross-linked gels occur at relatively low total polymer concentrations. Even concentrations as low as 0.1% (w/w) are sufficient to exhibit the cross-linking phenomenon, in contrast to Pluronic® polymers, Kabanov, A. V., et al. J. Control. Release, (1992), vol. 22, 141–158, which require a minimum concentration of 16% (w/w) for the formation of chemically cross-linked gels, Bromberg, L. E., et al. Advanced Drug Delivery Reviews, Elsevier Science B.V., (1998), 197–220.

Pluronic® polymers are commercially available stimuli responsive polymer gels, which are used as drug delivery vehicles. However, the very high concentrations required by these polymer solutions cause serious limitations to their applicability in drug delivery, making the new polymers a very attractive alternative.

Figure 2:
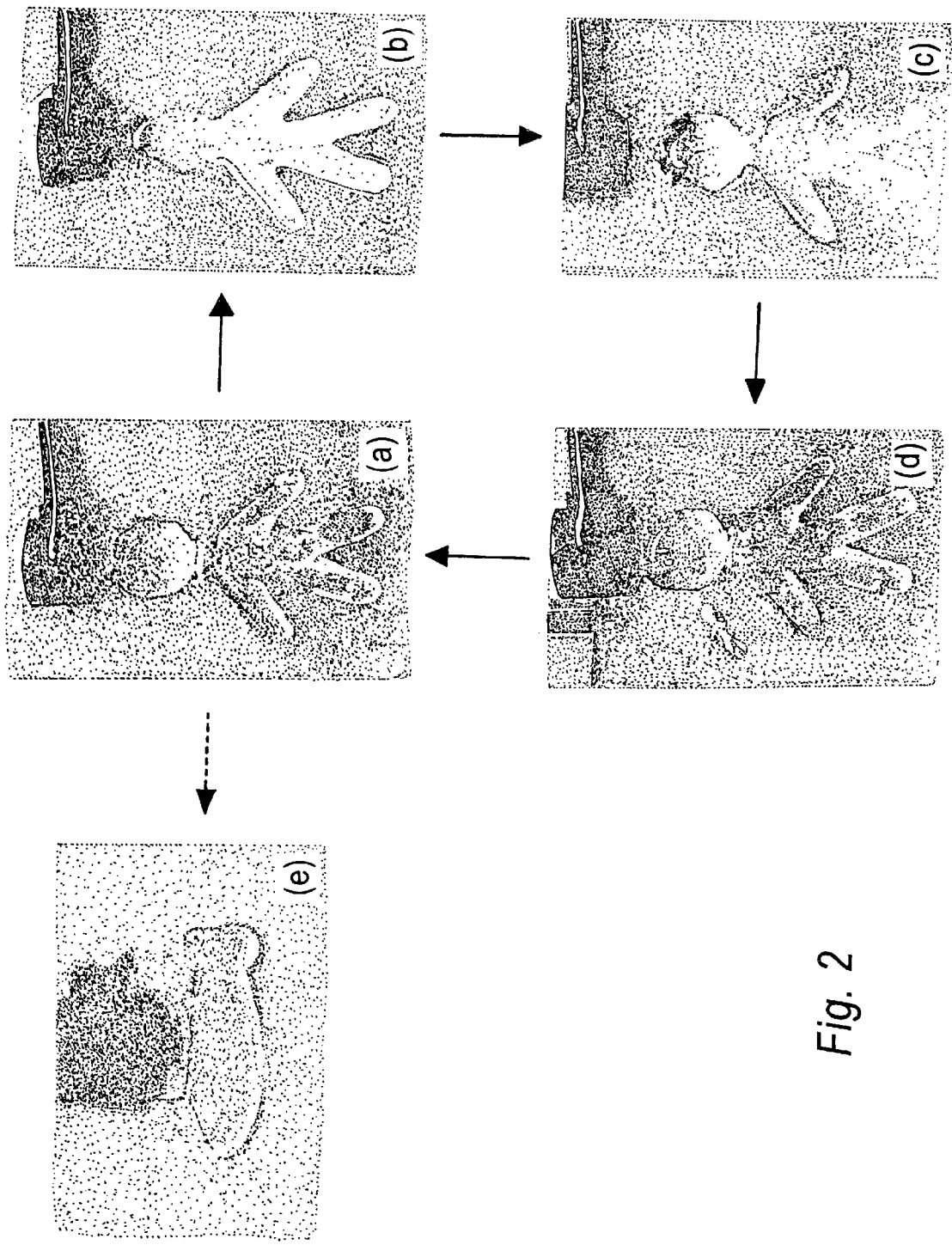

In FIG. 2 a clear aqueous solution of polymer (a) at low temperature goes turbid (b) with an increase in temperature forming a loose, physically cross-linked gel. Further increase in temperature induces a collapse of the gelled network to give a dense white gel with the same shape as the holding vessel (c). The gel is relatively stable even at ambient temperatures and can easily be removed from the water (d). The gel can be formed in another shape, simply by cooling to regain the polymer solution (a) and repeating the casting procedure using a different shaped vessel (e)

Physically cross-linked gels formed by NIPAAM-NASI-styrene polymers possess an interesting property to shrink on increasing temperature conserving the shape of the gel formed and hence giving a miniature version of the vessel where the gelation took place (FIG. 2b,c). The degree of shrinkage depends on the duration of heating and is around 2 when heated to ~38° C. but the gel shrinks continuously on sustained heating at 38° C., to a maximum of around 150 fold, in under 16 hours.

It is important to stress that the polymer solution must be heated relatively slowly (~0.2° C./min), to ensure that the entire mixture is heated at a uniform rate. If the temperature of the polymer solution is increased too rapidly, a "skin" effect occurs where the outermost parts of the gel cross-link first, forming a dense skin that is impenetrable to water which remains trapped inside, giving the overall shape of the cross-linked polymer gel, a bloated appearance. The dense skin layer of collapsed gel blocks both diffusion and convection flow through the gel pores, Bromberg, L. E., et al. Advanced Drug Delivery Reviews, Elsevier Science B.V., (1998), 197–220. The resulting shrunken gel is quite hard and can be easily removed from solution with pincers without deformation of the shape (FIG. 2d).

Nevertheless, no chemical bonds are formed between polymer molecules. The gel is completely dissolved in cold water (about 4° C.), though the swelling of the gel, which precedes the dissolution, requires about 24 h.

For chemically cross-linked thermo-sensitive gels, the gel is formed as the result of covalent bonds between polymer chains in a form of a relatively rigid body. Once formed, the shape of this body is fixed and cannot be altered without the destroying the integrity of the gel, but can be induced to swell or shrink depending on the external temperature imposed upon it.

Physically cross-linked gels, however, exhibit behaviour that is a combination of that of a thermo-sensitive polymer and that of a thermo-sensitive chemically cross-linked gel.

If the temperature is increased, slowly from below in an aqueous solution of NIPAAM-NASI-styrene polymer, to above the polymers LCST. The first stage of the process that follows is a trend similar to that observed for a thermo-sensitive polymer, where an increase in turbidity is seen with increasing temperature, up to the LCST, as physical cross-links are formed.

Figure 3:
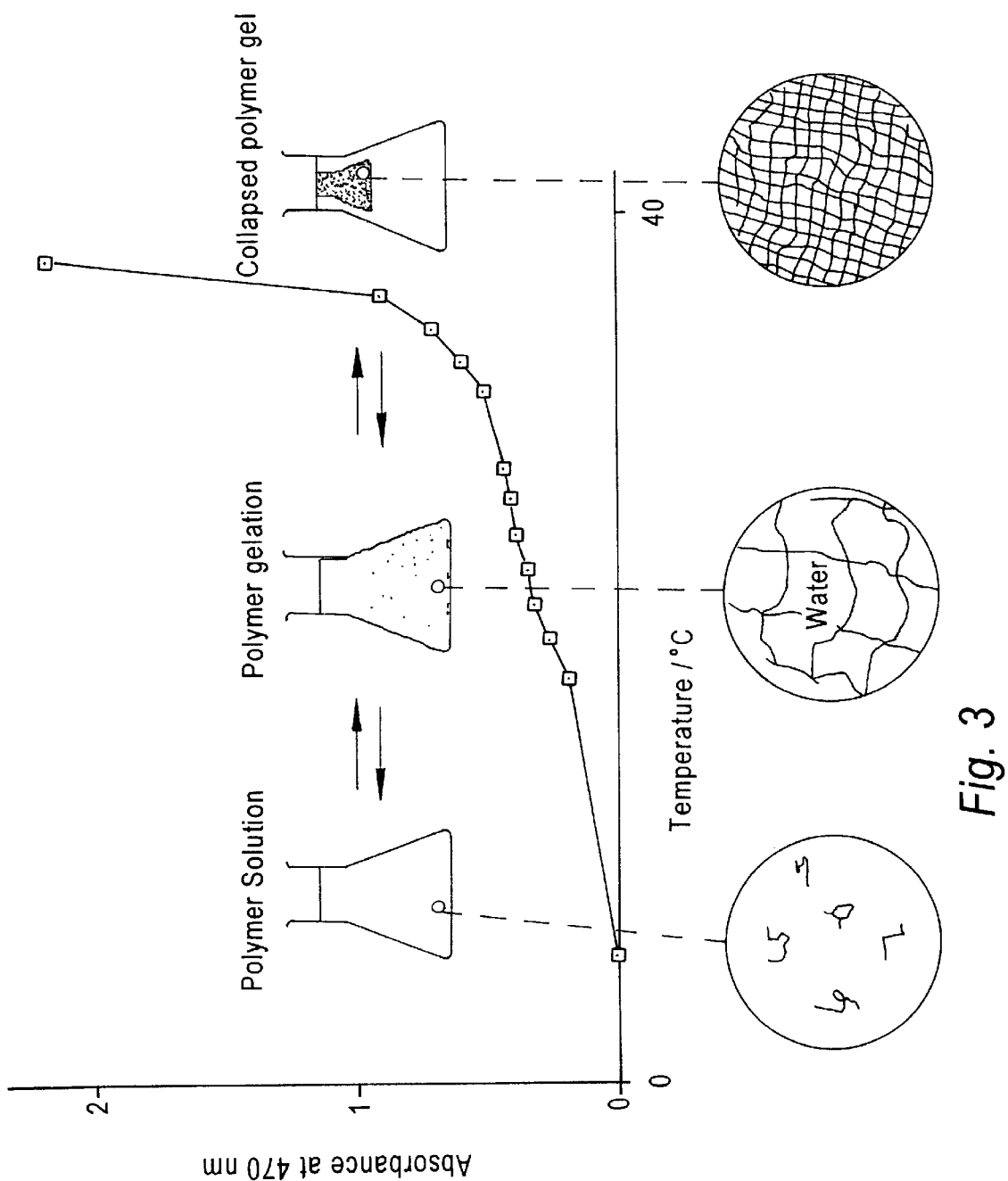
FIG. 3. Shows a schematic representation of physically cross-linked gel formation, superimposed on a typical trace for a gelling copolymer (poly(NASI$_{33}$-styrene-$_{19}$-NIPAAM$_{48}$)).

This can be seen in FIG. 3 where the polymer goes from a clear solution at low temperature to form a loosely cross-linked polymer gel on heating. Further heating causes a collapse of the gel to form a stable, shrunken gel. Resolubilisation of the gel is effected simply by cooling.

After this stage, a sharp transition is observed as the turbid suspension of loosely associated polymer gel suddenly collapses, undergoing simultaneous shrinkage and formation of a dense, white gel (FIG. 3). During the polymer gelation period (before collapse), attractive forces organise the polymer molecules in an ordered way, such that at the point of gel collapse (~38° C.), the relative orientation of the molecules is retained, and the resulting polymer gel maintains the same shape as the holding vessel. This gel is quite stable to mechanical damage, at ambient temperatures and above. Subsequent cooling of the gel, destroys the physical cross-links, and resumes a clear solution of the polymer, once again.

When the hydrogen bonding monomers NASI were exchanged for the hydrogen bonding 2-hydroxyethyl methacrylate (HEMA) monomers, a similar shape remembered gel of physically cross-linked copolymer was obtained. The obtained copolymer was poly(HEMA$_5$-styrene$_{25}$-NIPAAM$_{70}$)

In the least case, the resulting physically cross-linked gel offers obvious potential as a new device of protein and enzyme carrier, in applications as diverse as protein purification and drug-delivery. For a more imaginative outlook, one has to consider more closely how best to utilise all of the proffered properties this physically cross-linking gel has to offer, not the least of which is its curious "memory". This task is beyond the scope of this article and remains an open challenge.

What is claimed is:

1. A physically cross-linked copolymer formed from monomers comprising:

a) N-isopropyl acrylamide (NIPAAM);
   b) a hydrogen bonding monomer comprising N-acryloyl hydroxysuccinimide (NASI); and
   c) styrene in a relative molar ratio of about:

| | |
|---|---|
| N-isopropyl acrylamide (NIPAAM) | 48–58% |
| N-acryloyl hydroxysuccinimide (NASI) | 23–33% |
| Styrene | 19–23%. |

2. A drug delivery system comprising a physically cross-linked copolymer of claim 1.

3. An enzyme delivery system comprising the physically cross-linked copolymer of claim 1.

4. A medicament for oral, rectal or ophthalmic administration comprising a physically cross-linked copolymer of claim 1.

5. A cast shape comprising a physically cross-linked copolymer of claim 1.

6. A cast shape according to claim 5 in the form of a cavity.

7. A cast shape according to claim 5 for the production of miniaturized, detailed micro-parts or micro-machine parts.

8. A cast shape according to claim 5 in the form of thermal switches.

9. A physically cross-linked copolymer formed from monomers comprising:

a) N-isopropyl acrylamide (NIPAAM);
   b) a hydrogen bonding monomer comprising 2-hydroxyethyl methacrylate (HEMA); and
   c) styrene in a relative molar ratio of about:

| | |
|---|---|
| N-isopropyl acrylamide (NIPAAM) | 65–79% |
| 2-hydroxyethyl methacrylate (HEMA) | 1–8% |
| Styrene | 19–30%. |

10. A drug delivery system comprising a physically cross-linked copolymer of claim 1.

11. An enzyme delivery system comprising the physically cross-linked copolymer of claim 1.

12. A medicament for oral, rectal or ophthalmic administration comprising a physically cross-linked copolymer of claim 1.

13. A cast shape comprising a physically cross-linked copolymer of claim 1.

14. A cast shape according to claim 5 in the form of a cavity.

15. A cast shape according to claim 5 for the production of miniaturized, detailed micro-parts or micro-machine parts.

16. A cast shape according to claim 5 in the form of thermal switches.

* * * * *